(12) United States Patent
Kuznarik et al.

(10) Patent No.: US 7,240,947 B2
(45) Date of Patent: Jul. 10, 2007

(54) COMPACT TRUCK TAILGATE AND GENERAL PURPOSE UTILITY LADDER

(76) Inventors: John Kuznarik, 2909 Duffer Rd., Sebring, FL (US) 33872; Shirley Kuznarik, 2909 Duffer Rd., Sebring, FL (US) 33872

( * ) Notice: Subject to any disclaimer, the term of this patent is extended or adjusted under 35 U.S.C. 154(b) by 146 days.

(21) Appl. No.: 11/133,353

(22) Filed: May 20, 2005

(65) Prior Publication Data

US 2006/0261622 A1    Nov. 23, 2006

(51) Int. Cl.
    *B62D 25/22*    (2006.01)
(52) U.S. Cl. .................. 296/62; 180/127; 280/163
(58) Field of Classification Search ............... 296/62; 182/127; 280/166, 163, 164.1
    See application file for complete search history.

(56) References Cited

U.S. PATENT DOCUMENTS

| | | | | |
|---|---|---|---|---|
| 2,642,217 A | * | 6/1953 | Jennings | 182/88 |
| 3,669,218 A | | 6/1972 | Hall | |
| 3,858,905 A | | 1/1975 | Peebles | |
| 4,139,078 A | * | 2/1979 | Keller | 182/88 |
| 4,161,997 A | * | 7/1979 | Norman | 182/93 |
| 4,216,725 A | * | 8/1980 | Hallam | 105/348 |
| 4,757,876 A | | 7/1988 | Peacock | |
| 5,028,063 A | | 7/1991 | Andrews | |
| 5,312,150 A | * | 5/1994 | Quam | 296/62 |
| 5,672,152 A | | 9/1997 | Mason et al. | |
| 6,116,378 A | | 9/2000 | Barrow | |
| 6,173,812 B1 | * | 1/2001 | Spivey et al. | 182/88 |
| 6,270,139 B1 | | 8/2001 | Simpson | |
| 6,347,686 B1 | * | 2/2002 | Hedley et al. | 182/86 |
| 6,450,290 B1 | | 9/2002 | Spak | |
| 6,505,708 B2 | * | 1/2003 | LaBrash | 182/127 |
| 7,080,713 B1 | * | 7/2006 | Riggs | 182/127 |
| 7,111,858 B2 | * | 9/2006 | Manser et al. | 280/163 |
| 2006/0272895 A1 | * | 12/2006 | Lavoie | 182/127 |
| 2006/0272896 A1 | * | 12/2006 | Rajewski | 182/127 |

\* cited by examiner

*Primary Examiner*—Jason Morrow
(74) *Attorney, Agent, or Firm*—Venable LLP; Clifton E. McCann; Steven J. Schwarz

(57) ABSTRACT

An exemplary embodiment sets forth an apparatus, including a non-collapsible single unit stair comprising: a pair of opposing side rails supporting at least a top step and a bottom step; a coupler adapted to couple the apparatus to an edge of a horizontal surface; and a height adjustable user-support arm, coupled to one of the side rails with a rotatable coupling, wherein the user-support arm is moveable between a support position and a storage position.

20 Claims, 11 Drawing Sheets

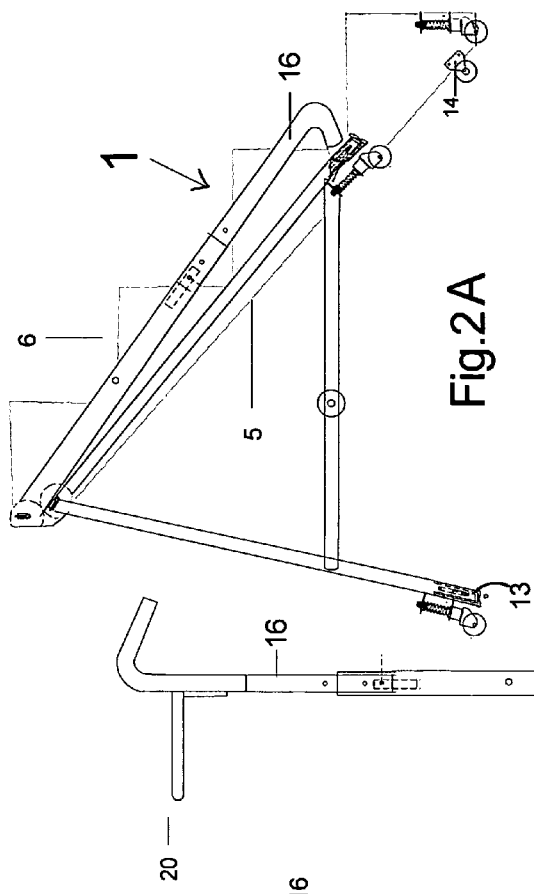
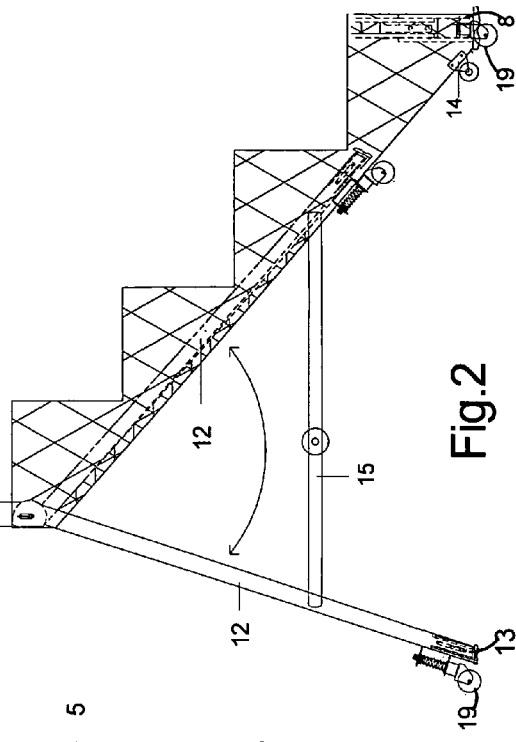
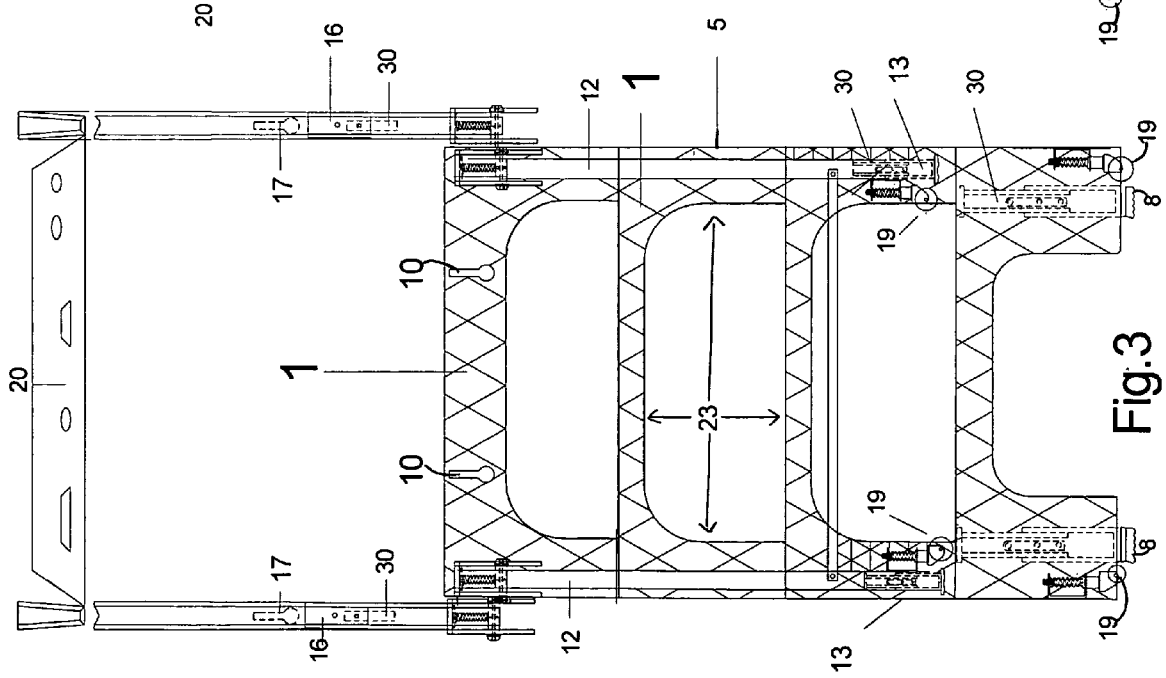
Fig. 2A
Fig. 2
Fig. 3

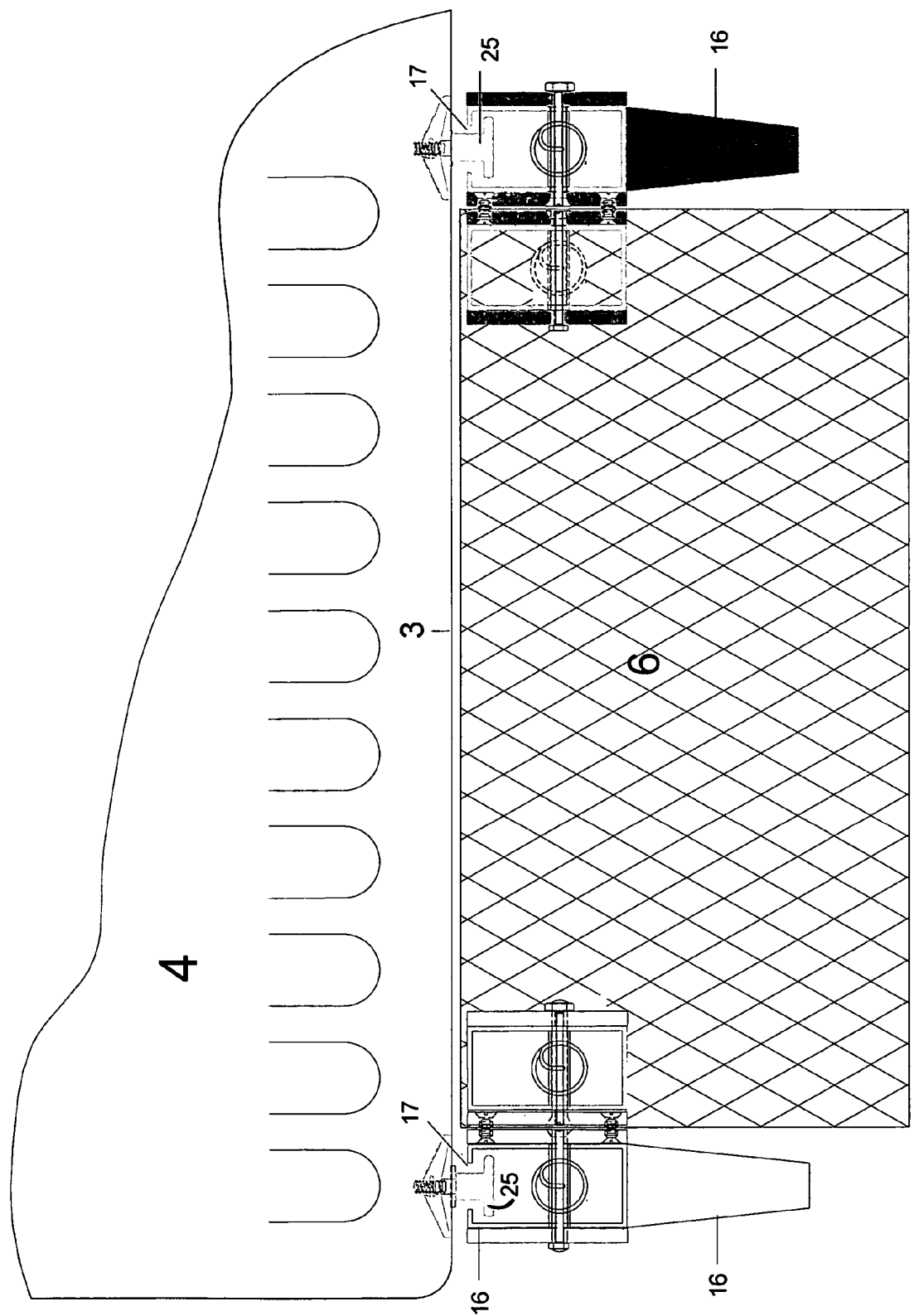

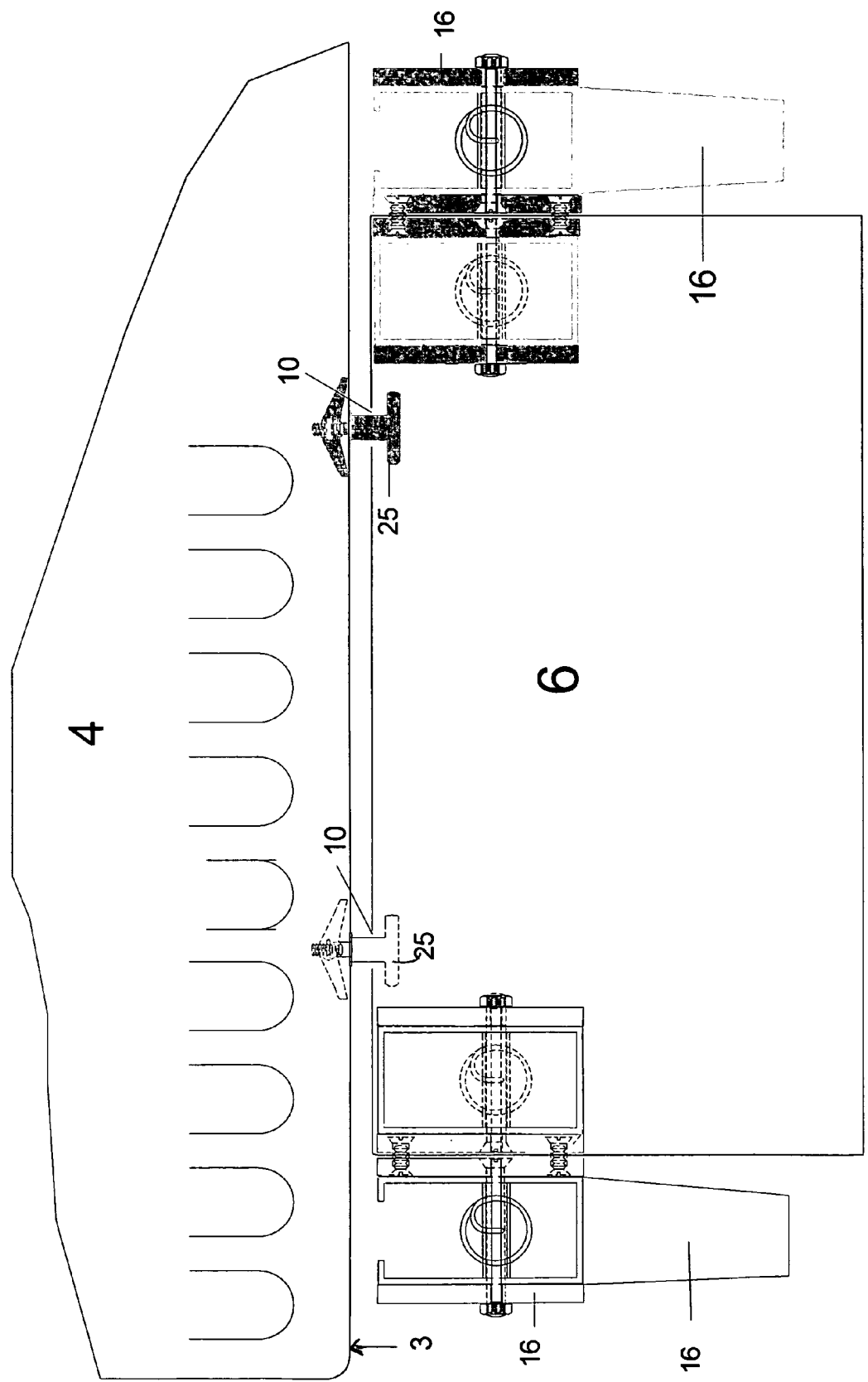

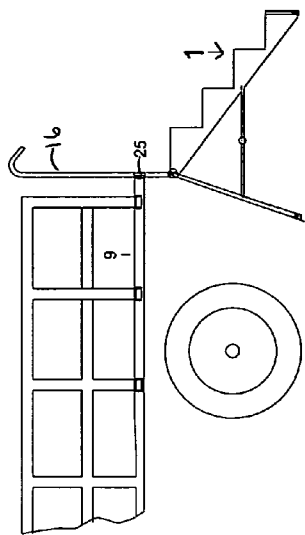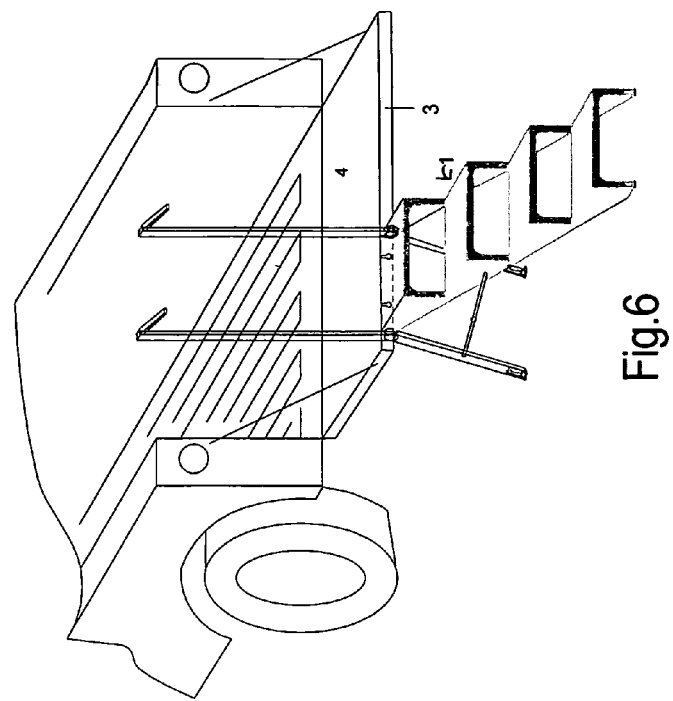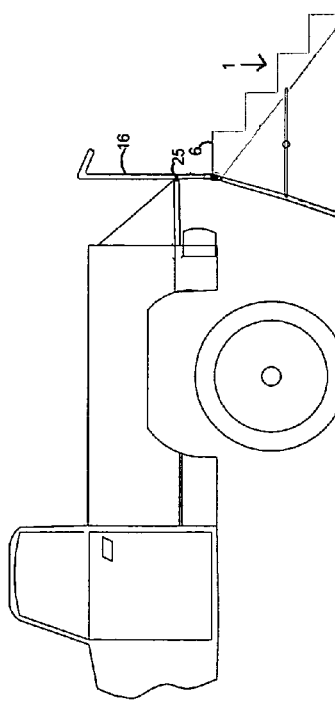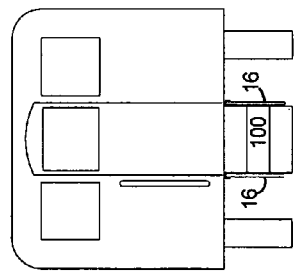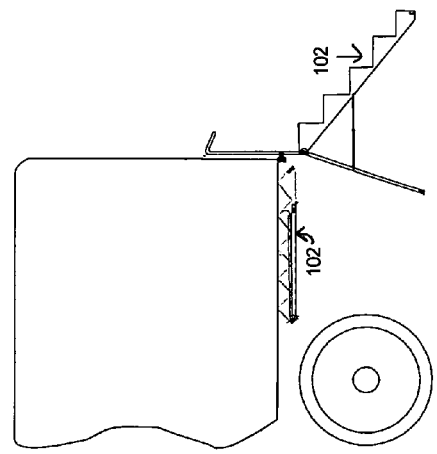

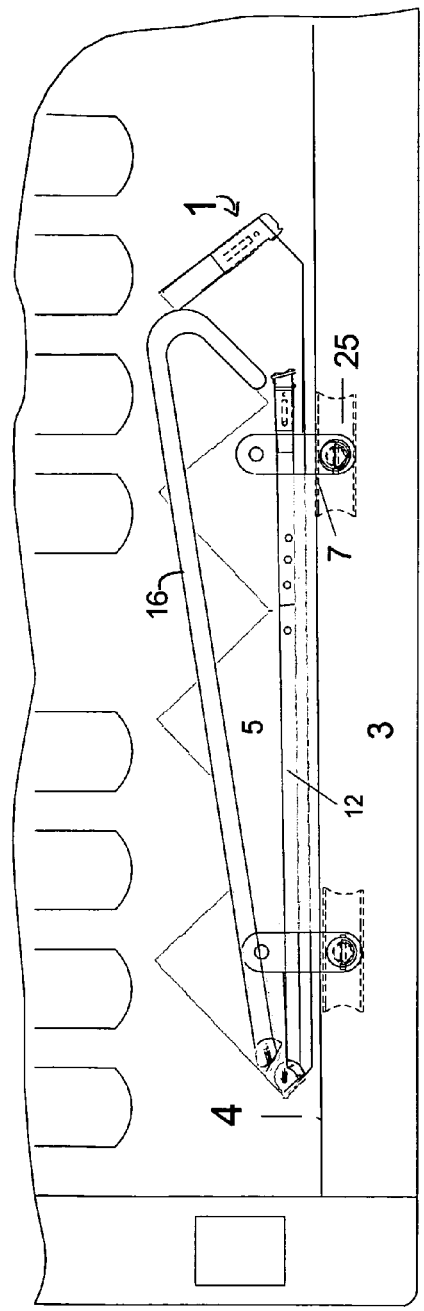
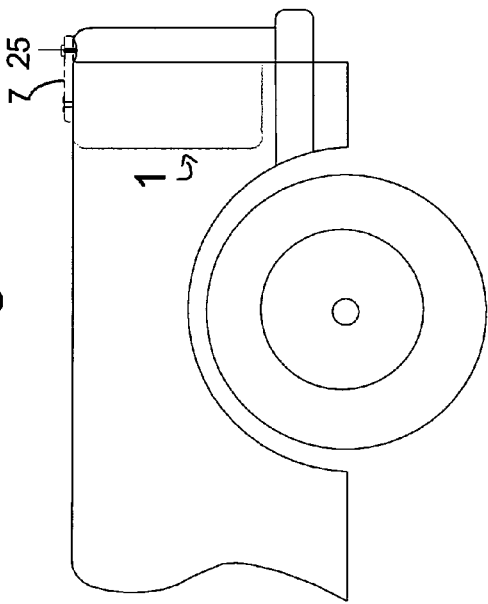
Fig 11
Fig. 12

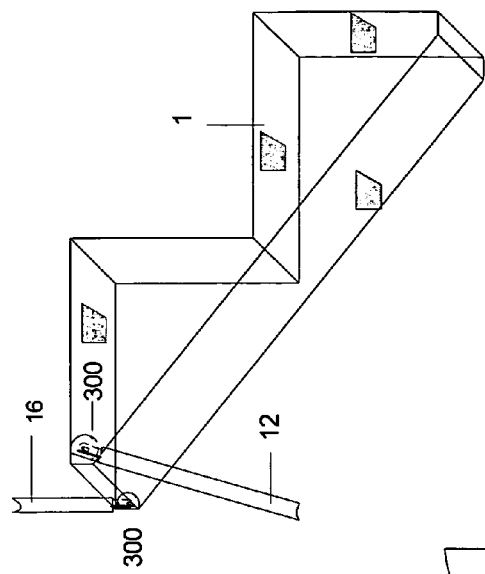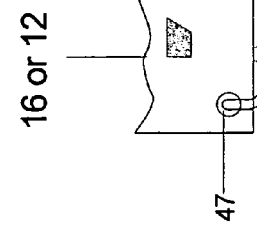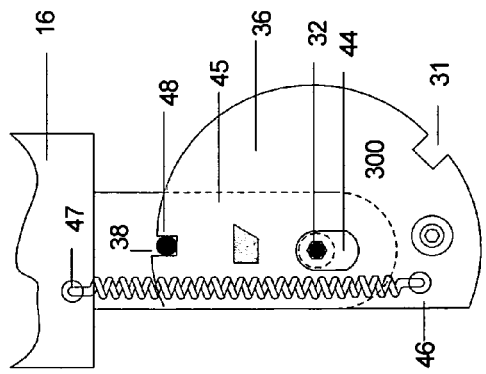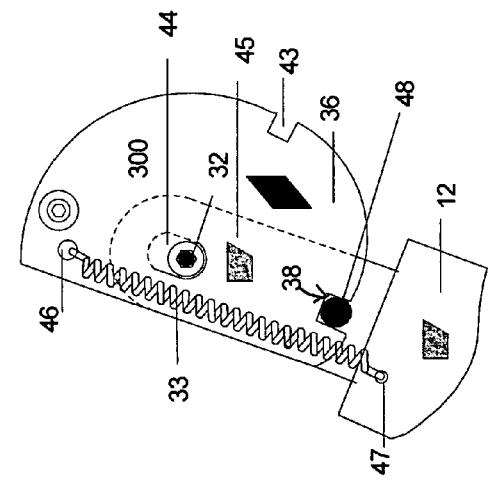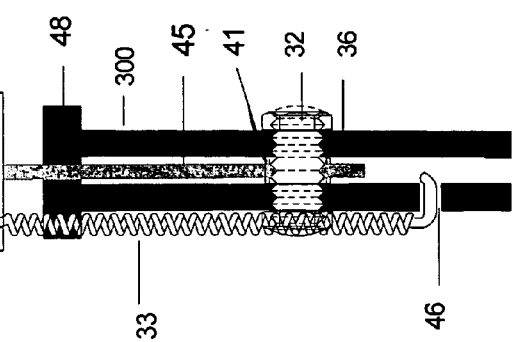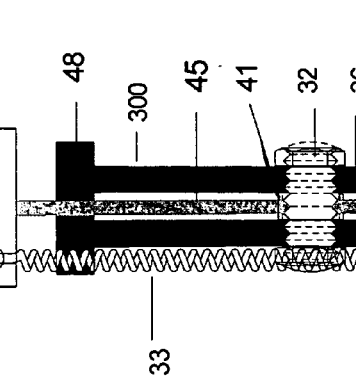

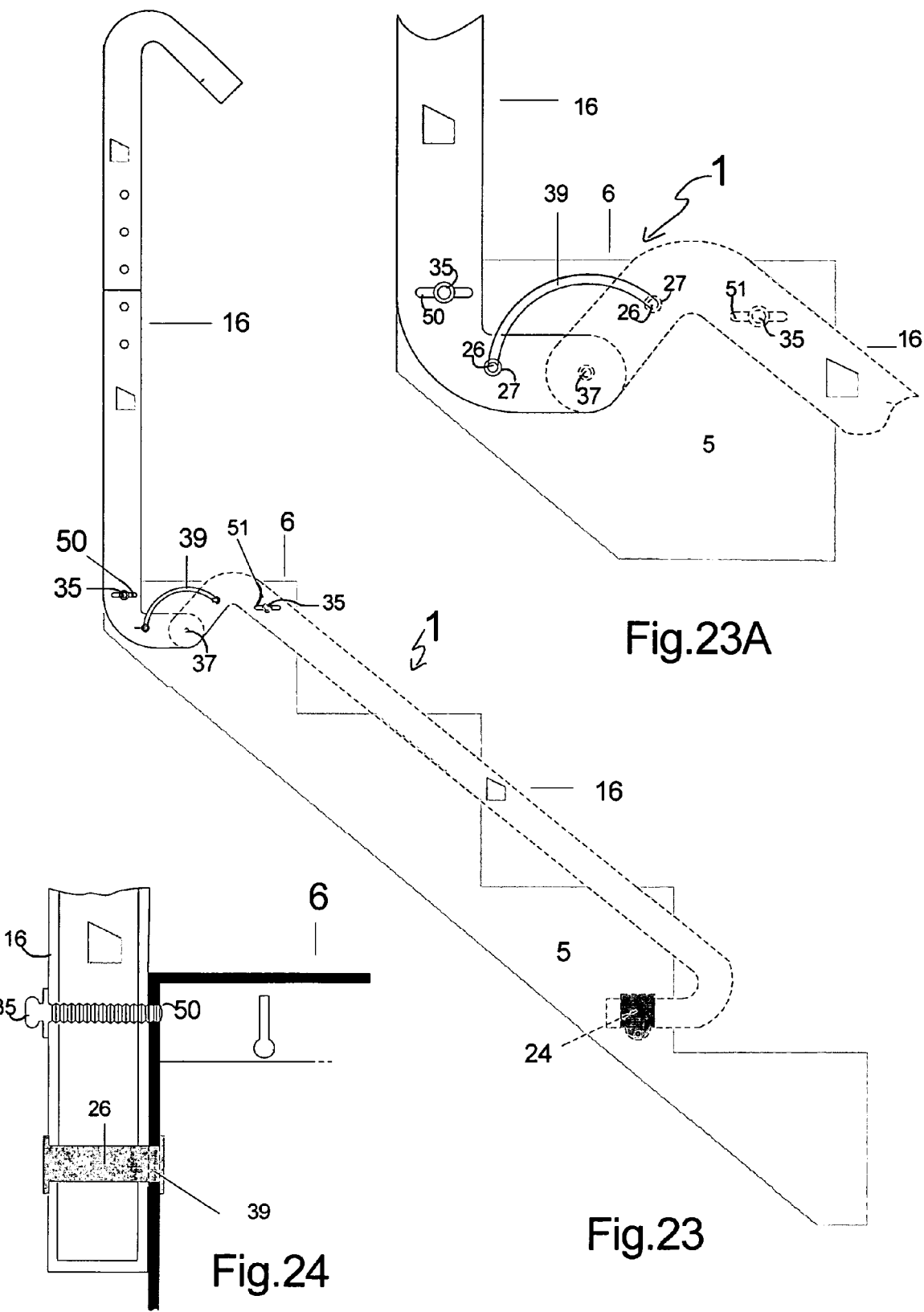

COMPACT TRUCK TAILGATE AND GENERAL PURPOSE UTILITY LADDER

BACKGROUND OF THE INVENTION

1. Field of the Invention

The present invention relates generally to ladders, and more particularly to a ladder suitable for use as a ladder for vehicles having a tailgate or flatbed, and as a general purpose free-standing ladder.

2. Related Art

Pickup tailgate-type vehicles, e.g., pickup trucks, sport utility vehicles (SUV), and station wagons, in today's world have become a vehicle of choice for a variety of reasons that were not as apparent in the past. A vehicle with a tailgate was considered a "work" type vehicle used in construction, farming, and industry.

Now there are extended cabs, four-door models with luxurious interiors with many features that were previously only found in fine automobiles. Today's SUVs, vans, station wagons, and pick-up trucks are broadly used for tailgate parties, at car races, ballgames, outdoor concerts, beach parties, and many other outdoor activities in addition to their traditional work-related uses.

Unfortunately, accessing a tailgate or flatbed of a vehicle can be quite an obstacle for many people. A major challenge is accessing the bed of the vehicle. It can be very difficult to reach over the side rails of the bed of a vehicle in order to retrieve an object, or to climb into the truck bed without the aid of a step assembly. It is even more difficult to exit the truck bed, whether a person is carrying something or simply trying to get down, because of the height of the tailgate from the ground.

The use of step assemblies for tailgate access is known in the art. However, conventional step assemblies have various shortcomings that make them an imperfect solution to the problem of tailgate and truck bed access.

Some tailgate step assemblies are mounted permanently to a base on the inside of the tailgate, which always encumbers the tailgate. Users of such tailgate step assemblies often have to exercise additional care not to trip over the permanently mounted assembly. Others are mounted permanently to the outside of the tailgate, which exposes the ladder to damage and theft.

Most tailgates or flatbed type vehicles have a standardized distance from the ground to the tailgate or flatbed of approximately 28 inches, 30 inches, 33 inches, 37 inches, or 49 inches. Some conventional tailgate step assemblies have only a single step, which does little to bridge the height gap from tailgate to ground. Still other tailgate step assemblies have very narrow steps, or steps with large height separations, which are difficult for the elderly or disabled to use, as well as tiring for those using the assembly for an extended period of time. For example, virtually all types of ladders and staircase type assemblies in today's marketplace have a step or rung riser height of 9.5 inches to 12 inches, while typical building staircases have riser heights of around 6 to 8 inches.

Most conventional tailgate step assemblies have no support arms. In tailgate step assemblies that do have support arms, the support arms are very short. Short support arms are essentially useless, particularly when leaving the vehicle bed. Most support arms are not permanently attached to the step assembly, which makes them very easy to forget or misplace.

Still other tailgate step assemblies have many moving parts or are collapsible, which tends to make them less stable and prone to malfunction.

Further, no conventional tailgate step assemblies are useable as free-standing step assemblies. If the user of the tailgate step assembly also needs a ladder or step assembly, for example, at a job site, the user would have to bring an extra ladder for that purpose.

What is needed then is an improved tailgate step assembly that overcomes shortcomings of conventional solutions.

SUMMARY OF THE INVENTION

Accordingly, an exemplary embodiment of the present invention includes a non-collapsible staircase-type step assembly that can be coupled to an outside vertical edge of a tailgate or vehicle flatbed, and that has height adjustable support arms. The step assembly may also have telescoping adjustable feet at the underside of the bottom step. The step assembly can be free-standing with a pair of ladder support legs, designed to steady and position the ladder steps (when in the user open position) in a precise horizontal position ready for use. The ladder support legs may also have telescoping adjustable feet attached to the bottom end of the legs. A pair of wheels or casters at the backside of the siderails at the bottom end of the ladder may allow for easy movement of the ladder in a closed position. When coupled to a tailgate, the ladder may leave the tailgate totally clear and unencumbered. The ladder may be easily removed for its many other diversified uses, and is not limited to just being attached to a tailgate or vehicle flatbed.

Embodiments of the present invention may provide for much safer access to the tailgate of a pickup truck when the tailgate is in the horizontal open position and/or the flatbed of a vehicle. With an exemplary riser height of 7 to 8 inches, embodiments of the present invention provide a very uniform standard type design to fit all vehicle tailgate or flatbed configurations.

The user comfort support railings may be permanently attached to the step assembly so they cannot be forgotten or left behind, and may be height adjustable.

In an exemplary embodiment of the present invention, an apparatus may include a non-collapsible single unit stair comprising: a pair of opposing side rails supporting at least a top step and a bottom step; a coupler adapted to couple the apparatus to an edge of a horizontal surface; and a height adjustable user-support arm, coupled to one of the side rails with a rotatable coupling, wherein the user-support arm is moveable between a support position and a storage position.

In one exemplary embodiment of the present invention, the apparatus is coupled to the edge of the horizontal surface, the apparatus does not encumber the horizontal surface substantially.

In one exemplary embodiment of the present invention, the apparatus may further include a second height-adjustable user-support arm.

In one exemplary embodiment of the present invention, the apparatus may further include a pair of support legs, each having a top end coupled with a rotatable leg coupling to a different side rail and a bottom end for resting on a support surface, wherein each support leg is moveable between an extended support position and a folded storage position.

In one exemplary embodiment of the present invention, the support legs are extended, the apparatus is capable of standing freely without being coupled to the horizontal surface.

In one exemplary embodiment of the present invention, the bottom end of each of the pair of support legs further comprises a height-adjustable foot.

In one exemplary embodiment of the present invention, each of the pair of support legs may further include a wheel coupled to the bottom end.

In one exemplary embodiment of the present invention, the apparatus is storable against a vertical surface.

In one exemplary embodiment of the present invention, the apparatus may further include a height-adjustable foot coupled to a bottom end of each of the side rails.

In one exemplary embodiment of the present invention, a wheel may be coupled to a bottom end of each of the side rails.

In one exemplary embodiment of the present invention, each step is approximately 15 inches wide.

In one exemplary embodiment of the present invention, each step is separated vertically from an adjacent step by approximately 7 to 8 inches.

In one exemplary embodiment of the present invention, the user-support arm is adjustable from a height of approximately 15 inches to a height of approximately 32 inches above the top step.

In one exemplary embodiment of the present invention, the apparatus may further include a utility tray coupled to the two user-support arms.

In one exemplary embodiment of the present invention, the coupler may include a fastening slot adapted to receive a bolt head extending from the edge of the horizontal surface.

In one exemplary embodiment of the present invention, the fastening slot may be disposed in the user-support arm, or top step.

In one exemplary embodiment of the present invention, the rotatable leg coupling may include: a pair of rotor limiting plates separated by a separation sleeve, each rotor-limiting plate having a user-ready slot and a storage slot in an outer edge, wherein an outer side of one rotor limiting plate is coupled to the side rail and an outer side of the other rotor limiting plate is coupled to the support leg; fastening means disposed substantially within the separation sleeve to fasten the pair of rotor limiting plates to each other, wherein the fastening means forms a pivot point for the support leg; a locking pin coupled to the support leg and adapted to fit in the user-ready and the storage slots; and tension adjusting means adapted to allow the locking pin to move radially inward and outward with respect to the pivot point.

In one exemplary embodiment of the present invention, the rotatable coupling may include a pair of rotor limiting plates separated by a separation sleeve, each rotor limiting plate having a user-ready slot and a storage slot in an outer edge, wherein an outer side of one rotor limiting plate is coupled to the side rail and an outer side of the other rotor limiting plate is coupled to the user-support arm; fastening means disposed substantially within the separation sleeve to fasten the pair of rotor limiting plates to each other, wherein the fastening means forms a pivot point for the user-support arm; a locking pin coupled to the user-support arm and adapted to fit in the user-ready and the storage slots; and tension adjusting means adapted to allow the locking pin to move radially inward and outward with respect to the pivot point.

In another exemplary embodiment of the present invention, a rotatable coupling may include: a pair of rotor limiting plates separated by a separation sleeve, each rotor limiting plate having a user-ready slot and a storage slot in an outer edge, wherein an outer side of one rotor limiting plate is adapted to be coupled to a fixed support and an outer side of the other rotor limiting plate is adapted to be coupled to a rotatable member; fastening means disposed substantially within the separation sleeve to fasten the pair of rotor limiting plates to each other, wherein the fastening means forms a pivot point for the rotatable member; a locking pin coupled to the rotatable member and adapted to fit in the user-ready and the storage slots; and tension adjusting means adapted to allow the locking pin to move radially inward and outward with respect to the pivot point.

In one exemplary embodiment of the present invention, the tension adjusting means may include a spring coupled at one end to the separation sleeve and at the opposite end to the locking pin.

In one exemplary embodiment of the present invention, the tension adjusting means may include: a spring adapted to be coupled at one end to the fixed support and at the opposite end to the rotatable member.

In one exemplary embodiment of the present invention, the rotatable coupling may include a curved slot disposed in said side rail; a rotation rivet coupled to said user support arm and disposed in said curved slot, adapted to move freely in said curved slot; a coupling adapted to couple said user-support arm to said side rail and to allow said user-support arm to rotate between said support position and said storage position; and means for preventing said user-support arm from moving when in said support position or said storage position.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements.

FIG. 2 depicts an exemplary side view of an exemplary embodiment of a four-step version of the invention in a free-standing user-ready position, according to the present invention;

FIG. 2A depicts the ladder shown in FIG. 2, with the user-support arms in the storage position;

FIG. 3 depicts an exemplary front view of the ladder in FIG. 2;

FIG. 4 depicts an exemplary top view of an exemplary top step of an embodiment of the present invention where the ladder attaches to the tailgate from slots provided in the user-support arms;

FIG. 5 depicts an exemplary top view of a top step of an embodiment of the present invention where the ladder attaches to the tailgate from slots provided in the vertical backdrop behind the top step;

FIG. 6 depicts an exemplary isometric view of the ladder shown in FIG. 1, secured to an outside adjacent vertical face of a tailgate in the horizontal position, by an exemplary fastening means or bolts;

FIG. 7 depicts an exemplary side view of the ladder shown in FIG. 1 coupled to a vehicle having a tailgate one step height higher than the top step of the ladder;

FIG. 8 depicts an exemplary side view of the ladder shown in FIG. 1, secured to a flatbed vehicle with fastening means provided in the user comfort support railings;

FIG. 9 depicts an exemplary front view of a ladder secured to the furthest outside vertical section of a deck at an emergency door exit of a bus type vehicle such as a school bus;

FIG. 10 depicts an exemplary side view of an exemplary five step version of the staircase type ladder in the open position which may be standing or secured adjacent to the bed or end of an enclosed tractor trailer like vehicle, and the staircase type ladder in an exemplary storage position under the bed of trailer;

FIG. 11 depicts an exemplary top view of an exemplary embodiment of the present invention mounted to inside of closed truck tailgate in an exemplary concealed storage position;

FIG. 12 depicts an exemplary side view of the stored ladder shown in FIG. 11;

FIG. 17 depicts an exemplary side view of a second exemplary embodiment of a rotatable coupling attaching a support leg to the ladder;

FIG. 18 depicts an exemplary side view of a second exemplary embodiment of a rotatable coupling attaching a user-support arm to the ladder;

FIG. 19 depicts an exemplary front view of the rotatable couplings shown in FIGS. 17 and 18, which may be used for a a support leg and a user-support arm, respectively;

FIG. 20 depicts an exemplary isometric view of the rotatable couplings shown in FIGS. 17 and 18, which may be used for a support leg and a user-support arm, respectively;

FIG. 23 depicts a side view of a third exemplary embodiment of a rotatable coupling used to couple a user-support arm to the side rail;

FIG. 23A is an enlarged view of the rotatable coupling shown in FIG. 23; and

FIG. 24 depicts a back view of an exemplary embodiment of a rotatable coupling used to couple a user-support arm to the side rail as shown in FIGS. 23 and 23A.

DETAILED DESCRIPTION OF EMBODIMENTS OF THE PRESENT INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
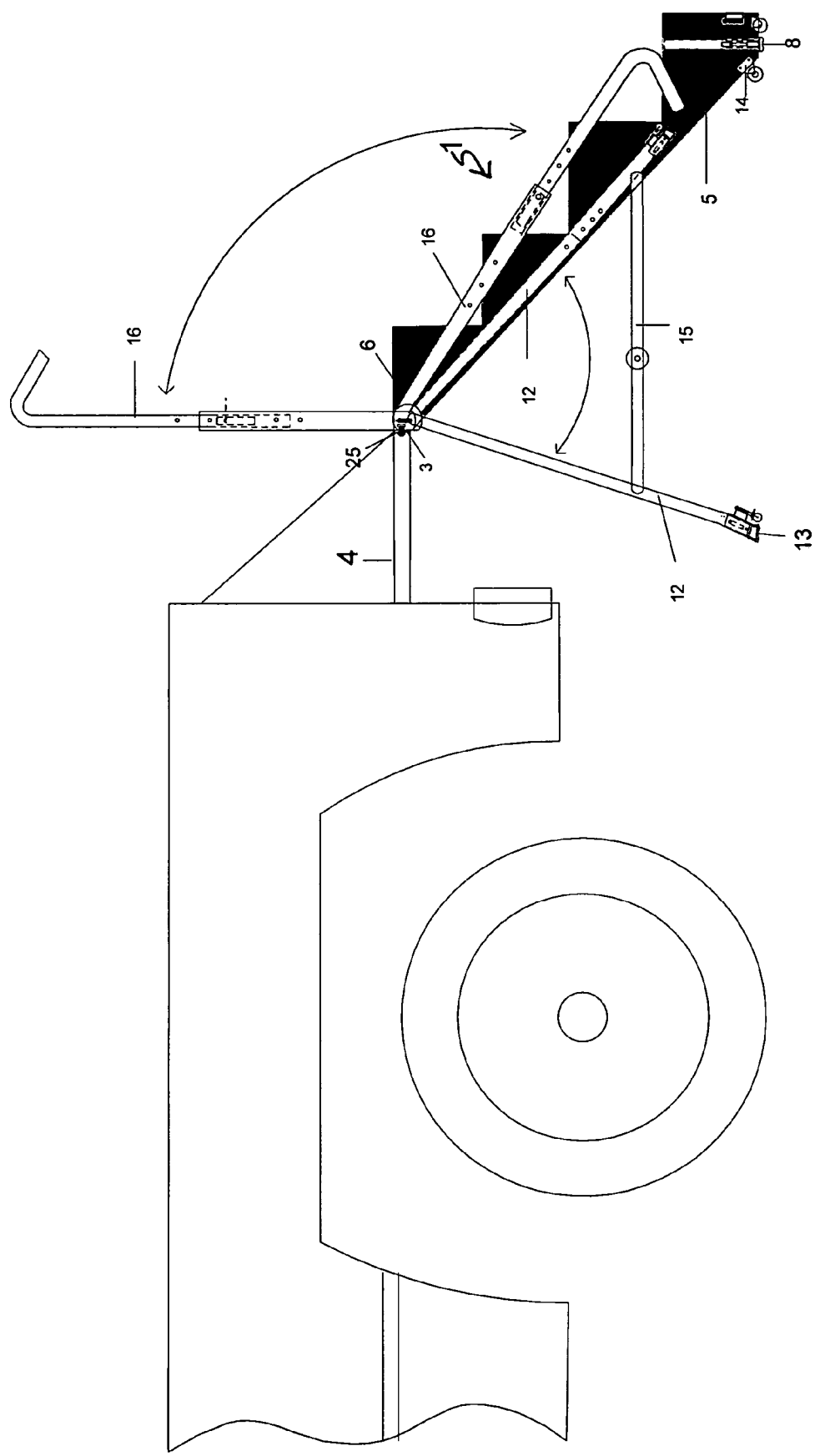
FIG. 1 depicts an exemplary side view of a four-step non-collapsible one-piece staircase type ladder in the open position attached to a truck tailgate according to an exemplary embodiment of the present invention.

FIG. 1 depicts a side view of a first exemplary embodiment of non-collapsible staircase-type ladder 1. The ladder 1 may include a non-collapsible single unit stair that may include a pair of opposing side rails 5 supporting four steps 6. Although the side rails 5 and steps 6 are discussed as separate components, exemplary embodiments of the present invention may comprise a single unit of side rails 5 and steps 6, formed, for example, from a single molded piece of plastic, fiberglass, aluminum plate, diamond plate, or stainless steel plate, etc., forming the side rails and steps. The ladder 1 may further include a pair of support legs 12, and one or two telescoping user-support arms 16. The stability of ladder 1 may be improved with a collapsible cross-brace 15 which may be coupled to side rail 5 and support leg 12.

The ladder 1 may be coupled to the outermost edge 3 of an open truck tailgate 4. The coupling mechanism may include, for example, tailgate-to-ladder fastening bolts 25 that may protrude from edge 3 of the tailgate 4. See FIGS. 4 and 5 below. Slots (not shown in FIG. 1, but see slots 17, 10 described further below with reference to FIGS. 3 and 6, respectively) may be provided in, e.g., the user-support arms 16, or in the back of the top step 6, that may be operative to slide over the fastening bolts 25 and secure the ladder 1 to the tailgate edge 3. In this first embodiment, when the tailgate 4 is secured to slots in the back of the top step of the ladder 1, the top step may be at the same elevation as the open tailgate 4. The fastening bolts 25 may move freely up and down while positioned in the slots, while the ladder 1 may stay immobile on the ground. Coupling the ladder 1 to the edge 3 of a tailgate 4 may leave the horizontal surface of the tailgate 4 unencumbered for access of people or materials. The user-support arm 16 and support leg 12 are also shown in a storage position on the outside of side rail 5, for reference.

When ladder 1 is in the access user ready position, as shown in FIG. 1, the slots may be centered at the same center as fastening bolts 25 when tailgate 4 is in the open horizontal position. In an exemplary embodiment, to achieve this alignment, for example, on uneven ground, the ends of the support legs 12 may be equipped with adjustable telescopic feet 13, and the inside face of the side rails 5 or the inside front face of the bottom step 6 may be equipped with adjustable telescopic feet 8. In an exemplary embodiment, the casters 14 may be installed on an outside bottom surface of the side rails 5 to allow the ladder 1 to be rolled about in a closed position.

FIG. 2 depicts an exemplary side view of ladder 1 in a free-standing, user-ready position, with telescoping user-support arms 16 fully extended, according to an exemplary embodiment. A utility tray 20 may be coupled to the upper ends of user-support arms 16 and ready for use. Height-adjustable feet 8 and 13 together may permit ladder 1 to be leveled when open on an uneven surface. In addition, in an exemplary embodiment, spring-actuated casters 19 may be coupled to the lower ends of support legs 12 or on the inside face of side rails 5, or on the inside front face of bottom step 6. In an exemplary embodiment, casters 19 may permit the operator to roll ladder 1 from one area to another without having to open and close ladder 1. This feature may be useful for trades people using the ladder in areas where the ladder may roll easily on the floor. The feature also makes it possible to move the ladder with any tools and supplies in use aboard the ladder without having to fold and carry the ladder and find another means for moving the tools and supplies. Support leg 12 is also shown in a storage position underneath steps 6.

FIG. 2A depicts an exemplary side view of ladder 1 in a free-standing, user-ready position, with user-support arms 16 in a storage position, where they can be mounted to an outside face of the side rails 5, which permits use of the ladder without the user-support arms 16. Support leg 12 is also show in a storage position against the outside of side rail 5.

FIG. 3 depicts a front view of ladder 1. Ladder 1 may provide a large opening 23 in the stair risers, which may allow the user's entire foot, or both feet, to be on one step 6. In an exemplary embodiment, each step may be about fifteen inches wide and may be about 9 inches deep. In an exemplary embodiment, each step may be vertically separated from an adjacent step by about seven to eight inches. In an exemplary embodiment, height-adjustable feet 13 may be attached to support leg 12 by matching up holes in leg 12 with holes on an insert piece on height-adjustable foot 13. Feet 8 may be adjusted by matching up holes in a foot 8 with holes on an insert piece, and by the insertion of a dimpled locking spring device 30. The insert piece may be on the inside face of the bottom step 6 or on the inside face of side rails 5. Foot 8 may be adjusted and secured at a desired position. The height of user-support arm 16 may be adjusted in a similar manner, or by any other securable, adjustable means. Slots 10 are indicated where they may be positioned, e.g., in the back of the top step 6. Slots 17 are shown in the back of user-support arms 16, although slots 17 may not be visible from the front of ladder 1. The use of slots 10 or slots 17 depends on the alignment of the tailgate or flatbed with the ladder. For example, if the tailgate or flat bed is higher than the top step 6, then slots 17 are used. If the tailgate or flatbed is at the same height as the top step 6, then slots 10 are used.

FIG. 4 depicts an exemplary top view of a top step of an exemplary embodiment of the present invention where the ladder may be attached to the tailgate from the user-support arms 16. The ladder 1 may be coupled to the vertical face 3 of tailgate 4, for example, by sliding slots 17, disposed in user-support arms 16, over tailgate-to-ladder fastening bolts 25 protruding from the vertical face 3 of open tailgate 4, or of a vehicle flatbed.

FIG. 5 depicts an exemplary top view of a top step of an embodiment of the present invention where the ladder may attach to the vertical face 3 of the open tailgate from the vertical backdrop behind the top step 6. Slots 10 may be disposed in the back of the top step that may be adapted to slide over fastening bolts 25.

FIG. 6 depicts an isometric view of the ladder shown in FIG. 1, secured to an outside face 3 of a tailgate 4 in the horizontal position, by fastening means which may be provided in the vertical back drop behind the top step 6. Fastening the ladder 1 to the tailgate 4 at the top step may allow the top step to be substantially level with the horizontal tailgate.

FIG. 7 depicts a side view of the ladder coupled to a tailgate, with fastening means provided in the user-support arms 16, where the tailgate is higher than the top step of the ladder.

FIG. 8 depicts a side view of the ladder secured to an exemplary flatbed trailer 9 with fastening means provided in the user-support arms 16. The fastening means may be, for example, bolts or other means described in relation to FIG. 4, or any of various conventional couplers, fasteners, or connectors. When the ladder is fastened by the user-support arms 16, the top step of the ladder may be positioned one step-height below the flatbed or tailgate height.

FIG. 9 depicts an exemplary front view of a ladder 100 secured to the furthest outside vertical section of the deck at the emergency door exit of a school bus type vehicle. The user-support arms 16 are shown stowed in a storage position.

FIG. 10 depicts an exemplary side view of an exemplary five-step embodiment 102 of the staircase type ladder in an open position which may be secured or standing adjacent to the bed of an enclosed tractor trailer like vehicle. Also shown is the staircase type ladder 102 in a storage position under the bed of the trailer.

FIG. 11 depicts a top view of ladder 1 which may be mounted to the inside of a closed truck tailgate in the concealed storage position. User-support arm 16 and support leg 12 are shown in a storage position on the outside face of side rail 5. FIG. 12 depicts an exemplary side view of the stored ladder shown in FIG. 11. The folded ladder assembly may be mounted, for example, by means of retractable storage brackets 7 coupled to the outer face 3 of tailgate 4 via fastening bolts 25.

Figure 15:
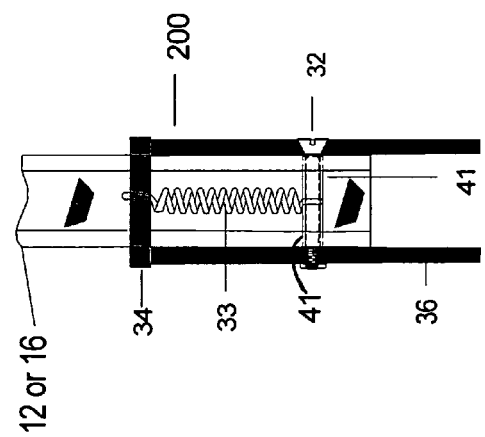
FIG. 15 depicts an exemplary front view of the rotatable couplings shown in FIGS. 13 and 14.
Figure 14:
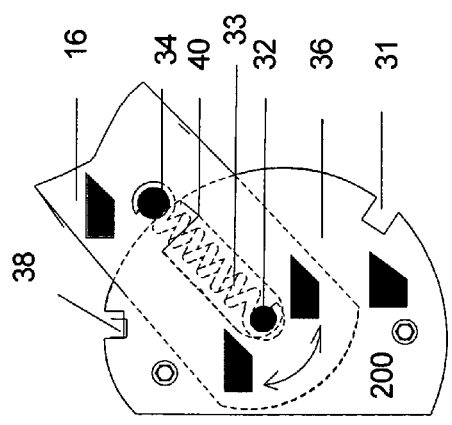
FIG. 14 depicts an exemplary side view of a first exemplary embodiment of a rotatable coupling which may attach a user-support arm to the ladder.
Figure 13:
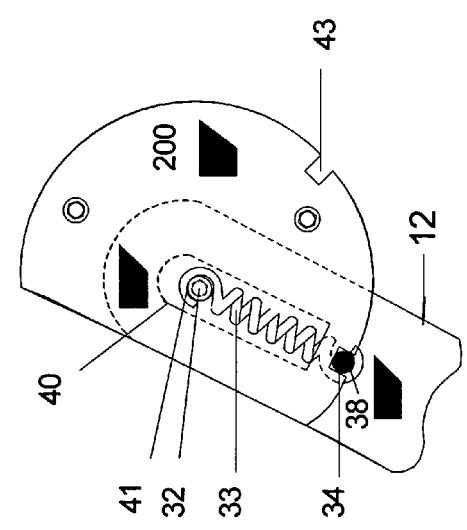
FIG. 13 depicts an exemplary side view of a first exemplary embodiment of a rotatable coupling which may attach a support leg to the ladder.

FIGS. 13–15 show various exemplary views of a first exemplary embodiment of a rotatable coupling 200 that may be used to couple support leg 12 or user-support arm 16 to an exemplary ladder according to embodiments of the present invention. Hereinafter, the coupling may be described as being attached to support leg 12, however, the coupling may be coupled analogously to user-support arm 16, as shown, for example, in FIG. 14.

Support leg 12 may be mounted in between rotor limiting plates 36. Each rotor limiting plate 36 may have at least two slots disposed in its outer edge: a storage slot 31, 43, and a user-ready slot 38. The couplings shown in FIGS. 13 and 14 are substantially similar, however, the separation and angle between the user-ready slot and storage slot in a support leg coupling may be different from the separation and angle in a user-support arm coupling. Although only two slots are described in detail below, any number of slots could be provided in the rotor limiting plates 36 to allow more flexibility in positioning the support legs 12 and the user-support arms 16. Rotor limiting plates 36 may be substantially semi-circular, or circular less a sector as illustrated, but are not limited to that shape.

A separation sleeve 41 may be placed between rotor limiting plates 36 and over a securing bolt 32. Separation sleeve 41 may be long enough to permit rotation of support leg 12 about separation sleeve 41. Support leg 12 may have a locking pin 34 mounted inside a hollow stanchion of support leg 12 that may penetrate the walls of support leg 12. Locking pin 34 may protrude from the outside face of support leg 12 for a length approximately equal to the thickness of the rotor limiting plate 36.

One end of a spring 33 may be coupled to locking pin 34, while the opposite end of spring 33 may be coupled to separation sleeve 41 in between rotor limiting plates 36. Spring 33 may be generally stretched and under tension at all times, resulting in locking pin 34 being held against the bottom of one of the user-ready or storage slots, as seen, e.g., in FIG. 13, or may be held against the outer edge of rotor limiting plates 36, as seen, e.g., in FIG. 14.

When locking pin 34 is in a slot, e.g., slot 38, a gap may be created between the bottom of contoured spring slot 40, and the bottom of separation sleeve 41. This gap may be approximately equal to the diameter of stationary locking pin 34. When the user desires to move support leg 12, or user-support arm 16, from one position to another, support leg 12 may be pulled such that locking pin 34 comes out of the slot where it rests. While locking pin 34 is out of its current slot, support leg 12 may be rotated to another slot while locking pin 34 slides along the outer edge of rotor-limiting plates 36. Pulling support leg 12 to remove locking pin 34 from a slot temporarily closes the gap.

Figure 16:
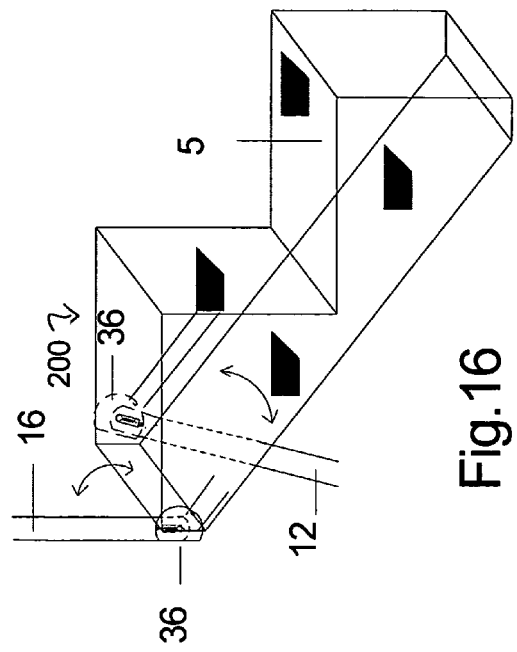
FIG. 16 depicts an exemplary isometric view of the rotatable couplings shown in FIGS. 13 and 14 which may be used for a support leg and a user-support arm, respectively.

FIG. 16 is described further below following FIG. 19.

FIGS. 17–19 show how various exemplary views of second exemplary embodiment of a rotatable coupling 300 that may be used to couple support leg 12 or user-support arm 16 to an exemplary ladder according to embodiments of the present invention. Hereinafter, the coupling is described as being attached to support leg 12, however, the coupling 300 may be coupled analogously to user-support arm 16, as shown, for example, in FIG. 18.

Support leg 12 may be coupled to a rotary plate 45 secured in between rotor limiting plates 36. A spring 33 may be secured at one end to support leg 12, for example, in a hole 47. The other end of spring 33 may be secured to rotor limiting plate 36, for example, in a hole 46. A configured slot 44 in rotary plate 45 may provide a gap between the bottom of the separation sleeve 41 and the bottom of the configured slot 44 approximately equal to the diameter of locking pin 48. This gap may permit locking pin 48 to move to the outside edge of rotor limiting plates 36 when more pressure is applied to spring 33, e.g., when support leg 12 is pulled on in the direction of the line of spring 33.

FIG. 16 shows an isometric view of part of an exemplary embodiment of the present invention, with user-support arm 16 secured to an outside face side rail 5 with rotatable coupling 200. Further, support leg 12 is shown secured to the inside face of side rail 5 with rotatable coupling 200. Support legs 12 may also be secured to the outside face of side rails 5 at a point just below user-support arms 16. User-support arm 16 and support leg 12 may be rotated from a user ready slot to a storage position slot or vice versa. Either of the embodiments shown in FIGS. 13–15 or FIGS. 17–19 may be used to couple support legs 12 or user-support arms 16 to the ladder 1. Additionally, other coupling mechanisms may also be used. FIG. 20 is analogous to FIG. 16, but for rotatable coupling 300.

Figure 21:
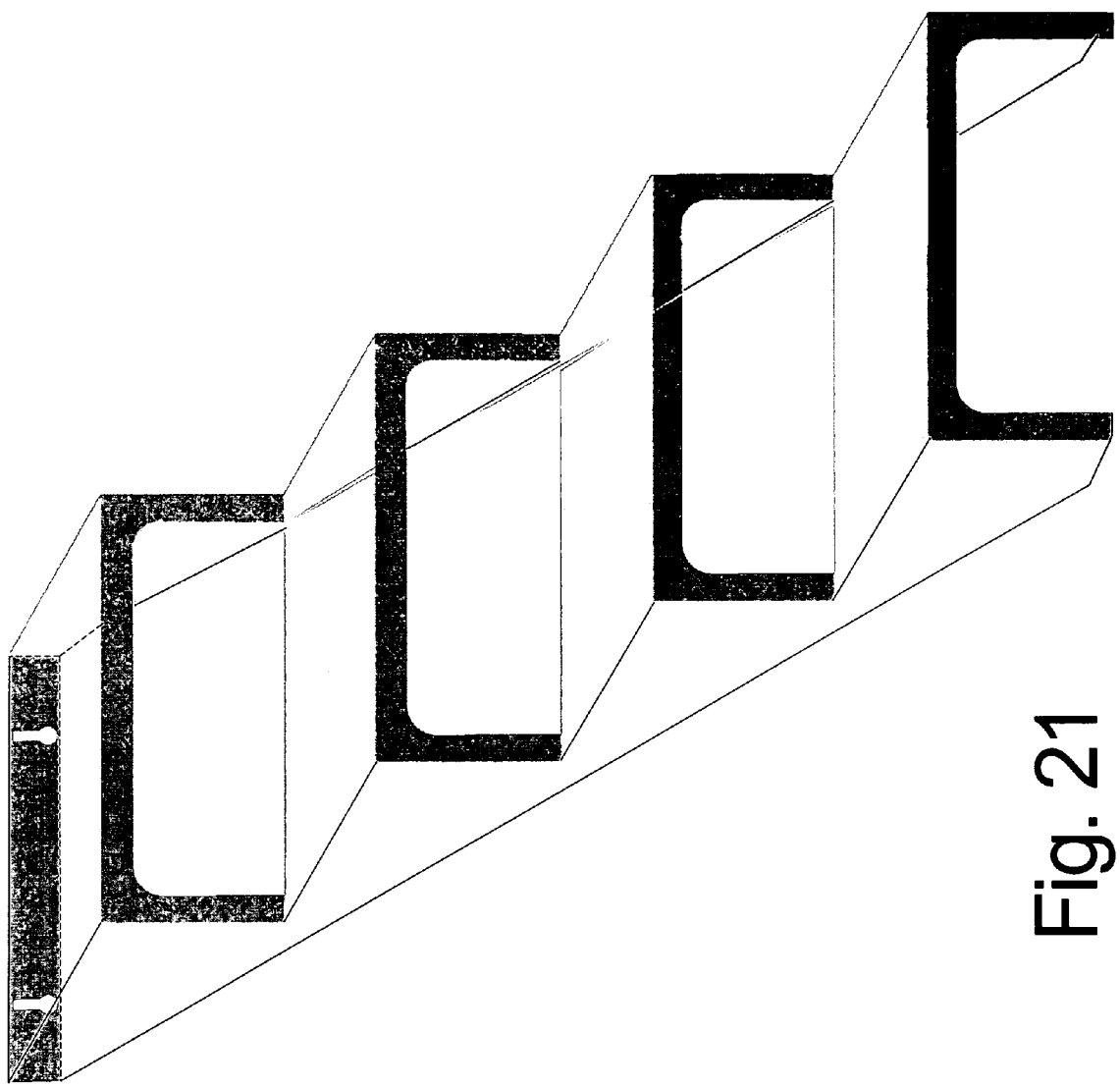
FIG. 21 depicts an isometric view of a one-piece solid ladder without attachments.

FIG. 21 shows an isometric view of a one-piece non-collapsible single-unit stair, without any additional components. The stair may be made in a mesh style, or solid. The stair may be made from, e.g., aluminum, diamond plate, stainless steel, fiberglass, nylon or plastic, formed or stamped from a one piece configuration. The steps of the stair may be perforated to prevent liquids from pooling on the steps. The steps may also have a non-skid surface.

Figure 22:
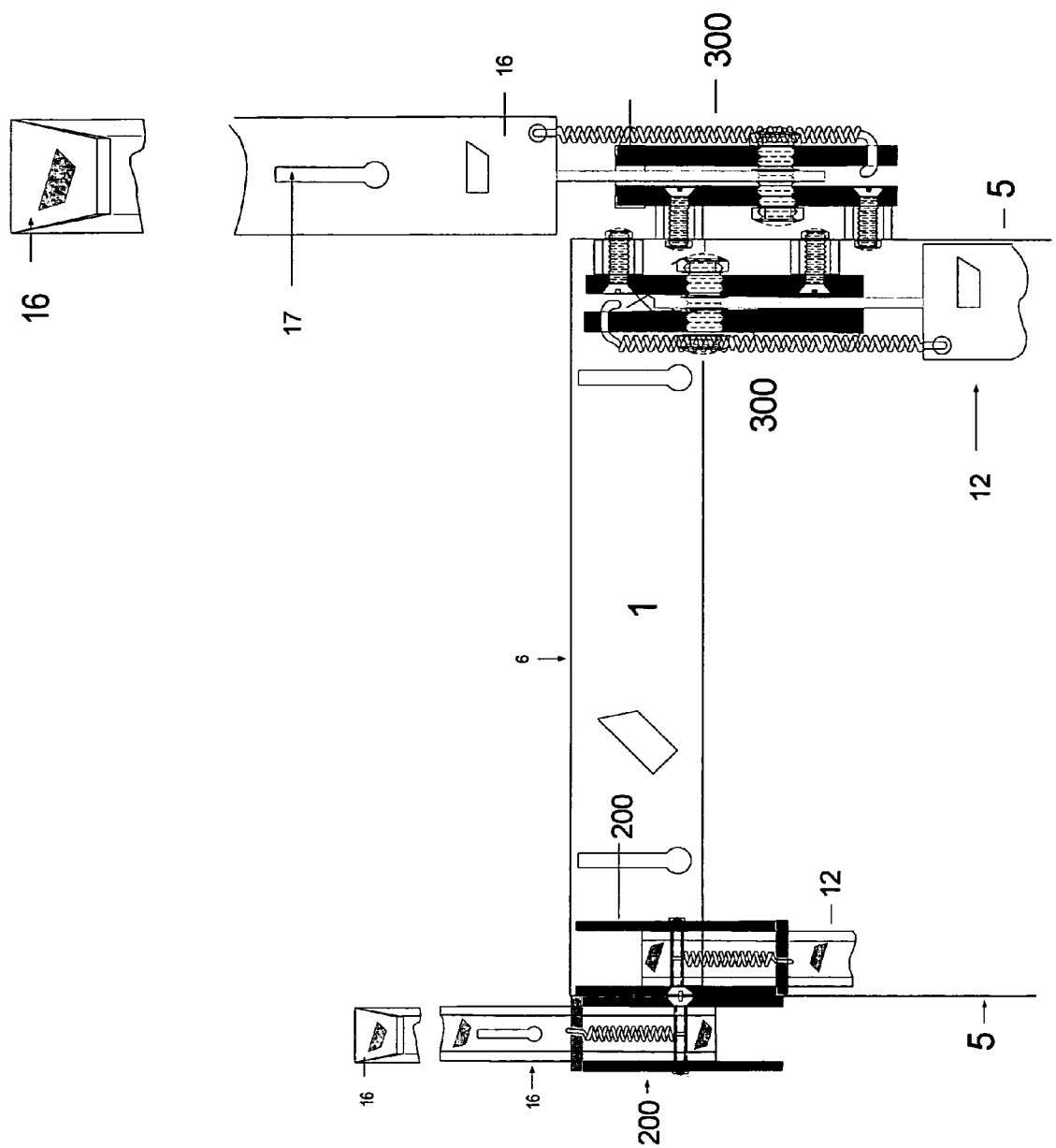
FIG. 22 depicts a rear view of an exemplary top step of the invention showing exemplary rotatable couplings.

FIG. 22 depicts a rear view showing the back side of the top step 6. The rotatable couplings 200 and 300, respectively, on the user-support arms 16 are shown coupled to the outside face of side rails 5, while the rotatable couplings 200 and 300 for the support legs 12 may be coupled to the inside face of side rails 5. The rotatable couplings for the support leg 12 may be coupled in the alternative to the outside face of side rails 5.

FIG. 23 depicts a side view of a third exemplary embodiment of a rotatable coupling used to couple a user-support arm 16 to the side rail 5. FIG. 23A is an enlarged view of the rotatable coupling shown in FIG. 23. FIGS. 23 and 23A show the user-support arm in the user ready and storage positions. The user-support arm 16 is pulled against the outside face of side rail 5 by a rotation rivet 37 that holds user-support arm 16 and side rail 5 together. User-support arm 16 may also be held in position with a rivet 26, whose shaft may pass through user-support arm 16 and curved slot 39. Slot 39 may be wide enough to permit penetration of the shaft of rivet 26. Rivet 26 may be disposed in a hole 27 in user-support arm 16. The shaft of rivet 26 may be long enough to extend from the outside face of user-support arm 16 to the inside face of slot 39 in side rail 5. The disposition of rivet 26 in slot 39 may permit the rotation of user-support arm 16 between a user-ready and a storage position. User-support arm 16 may be secured in position to side rail 5 by a thumbscrew 35 through a hole 50 (user ready position) or hole 51 (storage position), both in side rail 5. When in the storage position, user-support arm 16 may be further secured with a holding bracket 24 coupled to side rail 5.

FIG. 24 depicts a back view of the user-support arm 16 in a user ready position and secured to the outside face of side rail 5. Hole 50 in side rail 5 receives thumbscrew 35 to secure user-support arm 16. The shaft of rivet 26 fits within slot 39, and is held in slot 39 by the ends of the rivet 26.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An apparatus, comprising:
   a non-collapsible single unit stair comprising: a pair of opposing side rails supporting at least a top step and a bottom step;
   a coupler adapted to couple said apparatus to an edge of a horizontal surface;
   a height adjustable user-support arm, coupled to one of said side rails with a rotatable coupling, wherein said user-support arm is moveable between a support position and a storage position; and
   a wheel coupled to a bottom end of each of said side rails.

2. The apparatus of claim 1, wherein said apparatus is movable between a storage position and a user-ready position, and the apparatus does not substantially block the horizontal surface when the apparatus is in the user-ready position.

3. The apparatus of claim 1, further comprising a second height-adjustable user-support arm.

4. The apparatus of claim 1, further comprising: a pair of support legs, each having a top end coupled with a rotatable leg coupling to a different side rail and a bottom end for resting on a support surface, wherein each support leg is moveable between an extended support position and a folded storage position.

5. An apparatus, comprising:
   a non-collapsible single unit stair comprising: a pair of opposing side rails supporting at least a top step and a bottom step;
   a coupler adapted to couple said apparatus to an edge of a horizontal surface;
   a height adjustable user-support arm, coupled to one of said side rails with a rotatable coupling, wherein said user-support arm is moveable between a support position and a storage position; and
   a pair of support legs, each having a top end coupled with a rotatable leg coupling to a different side rail and a bottom end for resting on a support surface, wherein each support leg is moveable between an extended support position and a folded storage position.

6. The apparatus of claim 5, wherein when said support legs are extended, said apparatus is capable of standing freely without being coupled to the horizontal surface.

7. The apparatus of claim 5, wherein said bottom end of each of said pair of support legs further comprises a height-adjustable foot.

8. The apparatus of claim 5, wherein each of said pair of support legs further comprises a wheel coupled to said bottom end.

9. The apparatus of claim 1, wherein said apparatus is storable against a vertical surface.

10. The apparatus of claim 1, further comprising a height-adjustable foot coupled to an inside front face of said bottom step.

11. The apparatus of claim 1, wherein each step is approximately 15 inches wide.

12. The apparatus of claim 1, wherein each step is separated vertically from an adjacent step by approximately 7 to 8 inches.

13. The apparatus of claim 1, wherein each step is approximately 10 inches deep.

14. The apparatus of claim 1, wherein said user-support arm is adjustable from a height of approximately 15 inches to a height of approximately 32 inches above said top step.

15. The apparatus of claim 3, further comprising a utility tray coupled to said two user-support arms.

16. The apparatus of claim 1, wherein said coupler comprises: a fastening slot adapted to receive a bolt head extending from the edge of the horizontal surface.

17. The apparatus of claim 16, wherein said fastening slot is disposed in at least one of: said user-support arm, or said top step.

18. The apparatus of claim 5, wherein said rotatable leg coupling comprises:
a pair of rotor limiting plates separated by a separation sleeve, each rotor-limiting plate having a user-ready slot and a storage slot in an outer edge, wherein an outer side of one rotor limiting plate is coupled to said side rail and an outer side of the other rotor limiting plate is coupled to said support leg;
fastening means disposed substantially within said separation sleeve to fasten said pair of rotor limiting plates to each other, wherein said fastening means forms a pivot point for said support leg;
a locking pin coupled to said support leg and adapted to fit in said user-ready and said storage slots; and
tension adjusting means adapted to allow said locking pin to move radially inward and outward with respect to said pivot point.

19. The apparatus of claim 1, wherein said rotatable coupling comprises:
a pair of rotor limiting plates separated by a separation sleeve, each rotor limiting plate having a user-ready slot and a storage slot in an outer edge, wherein an outer side of one rotor limiting plate is coupled to said side rail and an outer side of the other rotor limiting plate is coupled to said user-support arm;
fastening means disposed substantially within said separation sleeve to fasten said pair of rotor limiting plates to each other, wherein said fastening means forms a pivot point for said user-support arm;
a locking pin coupled to said user-support arm and adapted to fit in said user-ready and said storage slots; and
tension adjusting means adapted to allow said locking pin to move radially inward and outward with respect to said pivot point.

20. The apparatus of claim 1, wherein said rotatable coupling comprises:
a curved slot disposed in said side rail; a rotation rivet coupled to said user support arm and disposed in said curved slot, adapted to move freely in said curved slot;
a coupling adapted to couple said user-support arm to said side rail and to allow said user-support arm to rotate between said support position and said storage position; and
means for preventing said user-support arm from moving when in said support position or said storage position.

* * * * *